(12) United States Patent
Kim et al.

(10) Patent No.: US 9,041,879 B2
(45) Date of Patent: May 26, 2015

(54) LIQUID CRYSTAL DISPLAY DEVICES AND METHODS OF MANUFACTURING LIQUID CRYSTAL DISPLAY DEVICES

(75) Inventors: Gee-Bum Kim, Yongin-si (KR); Jae-Hyun Kim, Yongin-si (KR); Won-Sang Park, Yongin-si (KR); Jae-Ik Lim, Yongin-si (KR); Yong-Seok Yeo, Yongin-si (KR); Jong-In Baek, Yongin-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 262 days.

(21) Appl. No.: 13/067,694

(22) Filed: Jun. 21, 2011

(65) Prior Publication Data
US 2012/0162590 A1 Jun. 28, 2012

(30) Foreign Application Priority Data
Dec. 23, 2010 (KR) ........................ 10-2010-0133214

(51) Int. Cl.
*G02F 1/1333* (2006.01)
*G02F 1/137* (2006.01)
*G02F 1/1339* (2006.01)

(52) U.S. Cl.
CPC ............ *G02F 1/137* (2013.01); *G02F 1/13394* (2013.01); *G02F 2001/13775* (2013.01)

(58) Field of Classification Search
USPC .............. 349/123–126, 129, 155–156, 86–91
See application file for complete search history.

(56) References Cited

U.S. PATENT DOCUMENTS

| | | | | |
|---|---|---|---|---|
| 5,604,613 | A * | 2/1997 | Shinjo et al. ................... | 349/147 |
| 7,623,203 | B2 * | 11/2009 | Hayashi et al. ................ | 349/112 |
| 7,911,562 | B2 * | 3/2011 | Okabe et al. .................... | 349/86 |
| 8,570,461 | B2 * | 10/2013 | Lee et al. ......................... | 349/86 |
| 2006/0240587 | A1 | 10/2006 | Yang | |
| 2010/0091222 | A1 * | 4/2010 | Swager ........................... | 349/88 |

FOREIGN PATENT DOCUMENTS

| | | |
|---|---|---|
| KR | 10-1995-0044296 A | 11/1995 |
| KR | 10-2001-0071865 A | 7/2001 |
| KR | 10-2001-0083303 A | 9/2001 |
| KR | 10-2006-0111261 A | 10/2006 |

* cited by examiner

*Primary Examiner* — Dung Nguyen
(74) *Attorney, Agent, or Firm* — Lee & Morse, P.C.

(57) ABSTRACT

A liquid crystal display device includes a first substrate, a first electrode on the first substrate, a second substrate opposed to the first substrate, and a second electrode on the second substrate. The second electrode corresponds to the first electrode. The liquid crystal display device also includes a liquid crystal structure between the first electrode and the second electrode. The liquid crystal structure includes a plurality of liquid crystal molecules and at least one movement control member. The movement control member in the liquid crystal structure restricts a movement of the liquid crystal molecules.

34 Claims, 9 Drawing Sheets

1

LIQUID CRYSTAL DISPLAY DEVICES AND METHODS OF MANUFACTURING LIQUID CRYSTAL DISPLAY DEVICES

CROSS-REFERENCE TO RELATED APPLICATION

This application claims priority under 35 USC §119 to Korean Patent Application No. 2010-0133214, filed on Dec. 23, 2010 in the Korean Intellectual Property Office, the contents of which are herein incorporated by reference in their entirety.

BACKGROUND

1. Field

Example embodiments relate to liquid crystal display devices and methods of manufacturing liquid crystal display devices. More particularly, example embodiments relate to liquid crystal display devices including movement control members and a method of manufacturing the liquid crystal display device.

2. Description of the Related Art

A liquid crystal display (LCD) device may include a liquid crystal layer located between two substrates, e.g., two transparent substrates, and may display an image by controlling light transmittance of pixels in the LCD device. The liquid crystal layer of the LCD device may be arranged between the two substrates and may be in a direction perpendicular to or in a direction parallel to the substrates. Electrodes, e.g., transparent electrodes, of the LCD device may be disposed on the substrates. When an electric field is generated between the electrodes, an alignment direction of liquid crystal molecules in the liquid crystal layer may be changed to control the transmittance of light. In case that an electric field is not generated between the electrodes, the alignment direction of the liquid crystal molecules returns to an initial alignment direction.

SUMMARY

Embodiments may be realized by providing a liquid crystal display device including a first substrate, a first electrode, a second substrate, a second electrode, a liquid crystal structure and at least one movement control member. The first electrode may be disposed on the first substrate. The second substrate may be substantially opposed to the first substrate. The second electrode may be disposed on the second substrate. The second electrode may substantially correspond to the first electrode. The liquid crystal structure may be disposed between the first electrode and the second electrode. The liquid crystal structure may include a plurality of liquid crystal molecules. The at least one movement control member may be disposed in the liquid crystal structure. The movement control member may restrict a movement of the liquid crystal molecules.

In example embodiments, the movement control member may include polymer.

In example embodiments, the movement control member may maintain a cell gap of the liquid crystal display device.

In example embodiments, the movement control member may have a substantially pillar shape, a substantially circular cylindrical shape, a substantially elliptical cylindrical shape, a substantially polygonal cylindrical shape, etc.

In example embodiments, a plurality of movement control members may be disposed in the liquid crystal structure by a constant distance or substantially various distances. The movement control members may contact one of the first electrode and the second electrode. Alternatively, at least one of the movement control members may be separated from one of the first electrode and the second electrode.

In example embodiments, an upper portion of the movement control member, a middle portion of the movement control member and a lower portion of the movement control member may have substantially the same width.

In example embodiments, at least one of an upper portion of the movement control member, a middle portion of the movement control member and a lower portion of the movement control member may have a width substantially different from widths of other portions of the movement control member.

In example embodiments, at least a portion of at least one of the liquid crystal molecules may be positioned in the movement control member.

In example embodiments, the liquid crystal display device may further include an alignment layer disposed on the first electrode or the second electrode. The alignment layer may include a reactive mesogen capable of forming the movement control member.

In example embodiments, the liquid crystal display device may have a main domain and a sub-domain in accordance with a position of the movement control member. The main domain may have a relatively low density of polymer and the sub-domain may have a relatively high density of polymer. The movement control member may be disposed in the sub-domain. For example, the number of the movement control members disposed in the sub-domain may be substantially larger than the number of the movement control members disposed in the main domain.

Embodiments may also be realized by providing a method of manufacturing a liquid crystal display device. In the method of manufacturing the liquid crystal display device, a first electrode may be formed on a first substrate and a second electrode may be formed on a second substrate substantially opposed to the first substrate. The first substrate may be combined with the second substrate. A preliminary liquid crystal structure may be formed between the first substrate and the second substrate. The preliminary liquid crystal structure may be exposed to form a liquid crystal structure and to form at least one movement control member in the liquid crystal structure. The liquid crystal structure may include liquid crystal molecules.

In example embodiments, the preliminary liquid crystal structure may include the liquid crystal molecules, a reactive mesogen, a photopolymerizable monomer and a photoinitiator. For example, a content of the reactive mesogen, the photopolymerizable monomer and the photoinitiator may be in a range of about 3% to about 30% by weight based on a total weight of the preliminary liquid crystal structure.

In example embodiments, the movement control member may be formed by performing an ultraviolet (UV) exposure process about the preliminary liquid crystal structure.

In example embodiments, an alignment layer may be additionally formed on the first electrode or the second electrode. The alignment layer may include a base material and a reactive mesogen. The movement control member may be formed from at least one of the alignment layer and the preliminary liquid crystal structure.

In the exposure of the preliminary liquid crystal structure according to example embodiments, a mask having a light shielding region and a transmissive region may be placed over the second substrate. The movement control member may be formed in a portion of the liquid crystal structure below the transmissive region by exposing the preliminary liquid crystal structure to a light using the mask.

In the exposure of the preliminary liquid crystal structure according to example embodiments, a mask having a transmittance control region and a transmissive region may be placed over the second substrate. The movement control member may be formed in the liquid crystal structure by exposing the preliminary liquid crystal structure to a light using the mask. In this case, the number of the movement control members formed in a portion of the liquid crystal structure below the transmissive region may be substantially larger than the number of the movement control members formed in a portion of the liquid crystal structure below the transmittance control region.

According to example embodiments, the LCD device may include at least one movement control member for preventing the movement of the liquid crystal molecules in the liquid crystal structure so that the pooling effect of the LCD device may be effectively prevented while a user touches the first substrate and/or the second substrate to operate the LCD device. Additionally, the movement control member including polymer may serve as a column spacer for maintaining the cell gap of the LCD device such that the LCD device may ensure a desired cell gap without an additional column spacer. When the LCD device includes the movement control member, the liquid crystal molecules may be arranged along a direction substantially the same as or substantially similar to a direction in which the movement control member is extended. Therefore, the LCD device may have reduced response speed by reducing the falling time of the liquid crystal molecules when voltage is not applied to the LCD device. Furthermore, the LCD device may have improved side visibility in accordance with the position of the movement control member because the LCD device may have multi domains including a main domain and a sub-domain by the movement control member.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
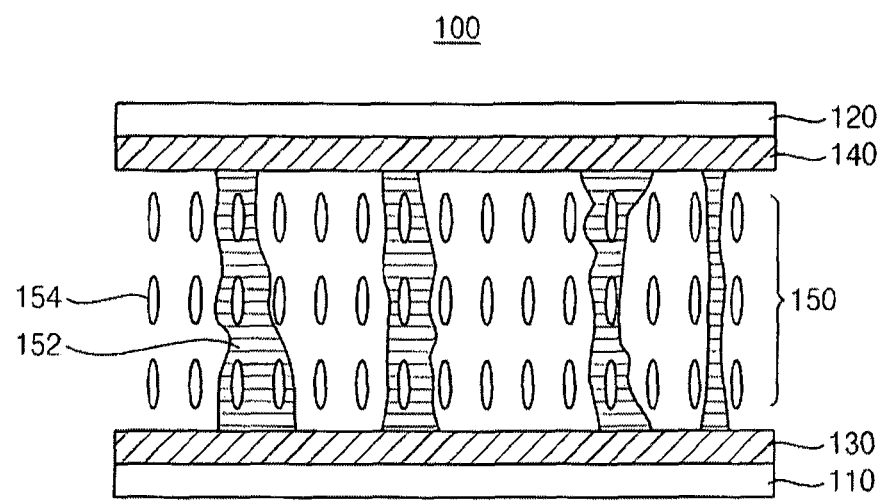
FIG. 1 illustrates a cross-sectional view of an LCD device in accordance with example embodiments.

Korean Patent Application No. 10-2010-0133214, filed on Dec. 23, 2010, in the Korean Intellectual Property Office, and entitled: "Liquid Crystal Display Devices and methods of Manufacturing Liquid Crystal Display Devices," is incorporated by reference herein in its entirety.

Various example embodiments will be described more fully hereinafter with reference to the accompanying drawings, in which some example embodiments are shown. The invention may, however, be embodied in many different forms and should not be construed as limited to the example embodiments set forth herein. Rather, these example embodiments are provided so that this description will be thorough and complete, and will fully convey the scope of the invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, fourth etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the invention. As used herein, the singular forms "a," "an" and "the" are intended to include the plural forms as well, unless the context clearly indicates otherwise. It will be further understood that the terms "comprises" and/ or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a cross-sectional view illustrating an LCD device in accordance with example embodiments.

Referring to FIG. 1, an LCD device 100 may include a first substrate 110, a second substrate 120, a first electrode 130, a second electrode 140, a liquid crystal structure 150, and movement control members 152.

Each of the first substrate 110 and the second substrate 120 may include a transparent insulation substrate. For example, the first and the second substrates 110 and 120 may include glass, transparent polymer, transparent ceramic, etc. In example embodiments, a first face of the first substrate 110 may substantially correspond to a first face of the second substrate 120. A second face of the first substrate 110 may be substantially opposed to the first face of the first substrate 110. A second face of the second substrate 120 may be substantially opposed to the first face of the second substrate 120. The first substrate 110 may be disposed substantially in parallel to the second substrate 120. Alternatively, the first substrate 110 may be arranged substantially perpendicular to the second substrate 120.

The first electrode 130 may be disposed on the first face of the first substrate 110. Wirings, a switching device and/or an insulation structure may be disposed between the first substrate 110 and the first electrode 130. For example, the wirings may include a gate line, a data line, etc. The switching device may include a thin film transistor (TFT), and the insulation structure may include a gate insulation layer, an insulation interlayer, etc.

The first electrode 130 may serve as a pixel electrode to which a data signal may be applied from the wiring including the data line. For example, the first electrode 130 may be positioned in a pixel region of the LCD device 100 such that the data signal provided from the wiring having the data line may be applied to the first electrode 130.

In example embodiments, the first electrode 130 may include a transparent conductive material capable of transmitting light therethrough. For example, the first electrode 130 may include indium tin oxide (ITO), indium zinc oxide (IZO), indium oxide (InOx), zinc oxide (ZnOx), tin oxide (SnOx), titanium oxide (TiOx), carbon nano tube (CNT), etc. These may be used alone or in a mixture thereof.

The second electrode 140 may be located on the first face of the second substrate 120. The second electrode 140 may substantially correspond to the first electrode 130. The second electrode 140 may serve as a common electrode commonly shared by a plurality of pixel regions of the LCD device 100. The second electrode 140 may also include a transparent conductive material for transmitting light therethrough. For example, the second electrode 140 may include ITO, IZO, indium oxide, zinc oxide, tin oxide, titanium oxide, CNT, etc. These may be used alone or in a combination thereof. In example embodiments, the second electrode 140 may include a material substantially the same as or substantially similar to that of the first electrode 130. Alternatively, the second electrode 140 may include a material different from that of the first electrode 130.

In example embodiments, color filters (not illustrated) may be disposed between the second substrate 120 and the second electrode 140. Light passing through the liquid crystal structure 150 may be filtered to colors of lights using the color filters. The color filters may include at least a red color filter, a green color filter, and a blue color filter, which may be employed to obtain a red (R) light, a green (G) light and a blue (B) light, respectively. Alternatively, the color filters may be disposed between the second electrode 140 and the liquid crystal structure 150.

In some example embodiments, at least one polarization plate (not illustrated) may be disposed on at least one of the first substrate 110 and the second substrate 120. For example, one polarization plate may be positioned on the second face of the first substrate 110 substantially opposed to the first face thereof on which the first electrode 130 is disposed. Additionally, another polarization plate may be additionally disposed on the second face of the second substrate 120 substantially opposed to the first face thereof on which the second electrode 140 is located. Furthermore, a first polarization plate and a second polarization plate may be provided on the first substrate 110 and the second substrate 120, respectively.

The liquid crystal structure 150 may be positioned between the first electrode 130 on the first substrate 110 and the second electrode 140 on the second substrate 120. The movement control member 152 including polymer may be disposed in the liquid crystal structure 150 having liquid crystal molecules 154. The liquid crystal structure 150 may have a thickness in a range of about several micrometers to about dozens of micrometers. The thickness of the liquid crystal structure 150 may vary in accordance with dimensions of the LCD device 100. For example, the thickness of the liquid crystal structure 150 may be increased or decreased in accordance with a size of the LCD device 100.

In example embodiments, the movement control member 152 may restrict a movement of the liquid crystal molecules 154. That is, the movement control member 152 may prevent and/or reduce slopping of the liquid crystal molecules 154. When the first substrate 110 and/or the second substrate 120 are pressed by users while utilizing the LCD device 100, the movement of the liquid crystal molecules 154 may be restricted by the movement control members. Therefore, the pooling effect of the LCD device 100 caused by the slopping of the liquid crystal molecules may be effectively reduced and/or prevented while the user presses the first substrate 110 and/or the second substrate 120 for operating the LCD device 100. Additionally, the bruising effect of the LCD device 100 may also be prevented and/or reduced by improving the restoration speed of the orientation of the liquid crystal molecules 154. Furthermore, the movement control member 152 may serve as a cell gap member in the LCD device 100 between the first substrate 110 and the second substrate 120, so that a cell gap of the LCD device 100 having the movement control member 152 may be ensured without an additional spacer.

In example embodiments, the liquid crystal molecules 154 may tend to arrange along the movement control member 152 disposed in a direction substantially perpendicular to the first substrate 110 and/or the second substrate 120. Thus, when a voltage is not applied to the LCD device, a falling time with respect to the response time of the liquid crystal molecules 154 may be shortened, such that the overall response time of the LCD device 100 may be improved. Additionally, when the LCD device 100 includes the movement control member 152, the LCD device 100 may have multi domains without requiring an additional element or changing the construction of the LCD device 100 as described below.

In some example embodiments, at least one movement control member 152 may be disposed between the first substrate 110 and the second substrate 120. For example, a plurality of the movement control members 152 may be located between the first substrate 110 and the second substrate 120. In this case, the movement control members 152 may be disposed by substantially the same or substantially similar distance. Alternatively, a plurality of the movement control members 152 may be arranged between the first substrate 110 and the second substrate 120 by substantially different distances. Each of the movement control members 152 may have an arbitrary shape. For example, each of the movement control members 152 may have a substantially pillar shape, a substantially circular cylindrical shape, a substantially elliptical cylindrical shape, a substantially polygonal column shape, etc. However, the shapes of the movement control members 152 may not be limited as described above.

In example embodiments, an upper portion of the movement control member 152 may have a width substantially the same as or substantially similar to a width of a middle portion of the movement control member 152. Further, a lower portion of the movement control member 152 may have a width substantially the same as or substantially similar to the width of the middle portion of the movement control member 152. Namely, the movement control member 152 may have an entirely uniform width. Alternatively, the upper portion, the middle portion and the lower portion of the movement control member 152 may have various widths and substantially different widths, respectively. For example, the upper portion of the movement control member 152 and/or the lower portion of the movement control member 152 may have a width substantially larger than that of the middle portion of the movement control member 152. Further, the middle portion of the movement control member 152 may have a width substantially larger than that of the upper portion of the movement control member 152 and/or that of the lower portion of the movement control member 152. The widths of the portions of the movement control member 152 may vary in accordance with the dimensions of the liquid crystal structure 150. For example, the movement control member 152 may have a width in a range of about several micrometers to about dozens of micrometers.

In example embodiments, the movement control member 152 may have a height substantially the same as or substantially smaller than a thickness of the liquid crystal structure 150. The movement control member 152 may contact the first electrode 130 and/or the second electrode 140. Alternatively, the movement control member 152 may be separated from the first electrode 130 and/or the second electrode 140 by a predetermined distance. For example, the movement control member 152 may have a height of about several micrometers to about dozens of micrometers. The dimension and/or the structure of the movement control member 152 may vary in accordance with process conditions for forming the movement control member 152.

In example embodiments, the movement control member 152 may be formed using all of or at least one of a reactive mesogen (RM), a photopolymerizable monomer, and a photoinitiator, etc. Examples of the RM in the movement control member 152 may include a monomer RM, an oligomer RM, a photopolymerizable RM, etc.

In example embodiments, at least one liquid crystal molecule 154 may be partially and/or entirely dispersed in the movement control members 152. For example, some of the liquid crystal molecules 154 of the liquid crystal structure 150 may be positioned in the movement control members 152, and others of the liquid crystal molecules 154 of the liquid crystal structure 150 may be located between adjacent the movement control members 152. Further, at least one liquid crystal molecule 154 may be partially and/or totally enclosed by the movement control members 152. For example, each of the liquid crystal molecules 154 may be enclosed totally enclosed by the movement control member 152, or a portion of each liquid crystal molecule 154 may be positioned in the movement control member 152. In some example embodiments, the movement control members 152 may not include the liquid crystal molecules 154 therein. For example, the liquid crystal molecules 154 may be deviated from the movement control member 152. That is, the movement control member 152 may not include the liquid crystal molecules 154. Here, the movement control member 152 may pass between the adjacent liquid crystal molecules 154 and may contact the first electrode 130 and/or the second electrode 140.

Figure 2A:
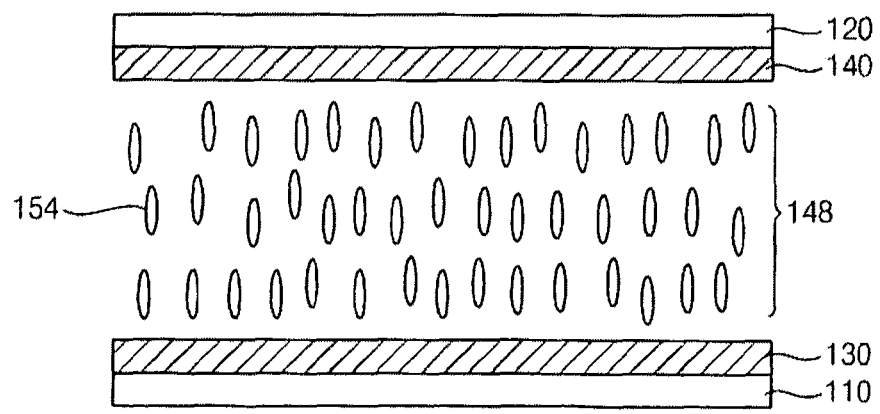
FIGS. 2A and 2B illustrate cross-sectional views showing a method of manufacturing an LCD device in accordance with example embodiments.
Figure 2B:
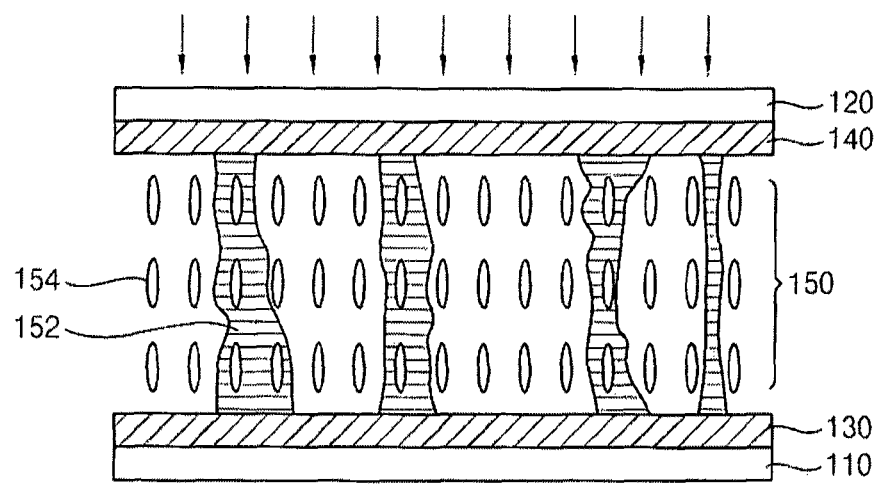

FIGS. 2A and 2B are cross-sectional views illustrating a method of manufacturing an LCD device in accordance with example embodiments.

Referring to FIG. 2A, a first electrode 130 may be formed on a first face of a first substrate 110. The first substrate 110 may include a transparent insulation material. For example, the first substrate may be formed using glass, transparent polymer, transparent ceramic, etc. In example embodiments, a switching structure may be formed between the first substrate 110 and the first electrode 130. The switching structure may include a wiring, a switching device, an insulation structure, etc. For example, the switching structure may include a gate line, a data line, a TFT, an insulation interlayer, etc.

The first electrode 130 may be formed on the first face of the first substrate 110 using a transparent insulation material by a sputtering process, a printing process, a spray process, etc. In example embodiments, a first conductive layer (not illustrated) may be formed on the first face of the first substrate 110 and then the first conductive layer may be patterned to obtain the first electrode 130 on the first substrate 110. The first conductive layer may be formed using ITO, IZO, indium oxide, zinc oxide, tin oxide, titanium oxide, CNT, etc. These may be used alone or in a combination thereof.

A second electrode 140 may be formed on a first face of a second substrate 120. The second electrode 120 may include a transparent insulation material, for example, glass, transparent polymer, transparent ceramic, etc. The first face of the second substrate 120 may substantially correspond to the first face of the first substrate 110. In example embodiments, the second electrode 140 may be obtained by patterning a second conductive layer (not illustrated) after forming the second conductive layer on the first face of the second substrate 120. The second conductive layer may be formed by a sputtering process, a printing process, a spray process, etc.

In some example embodiments, color filters (not illustrated) may be formed on a second face of the second substrate 120. The second face of the second substrate 120 may be substantially opposed to the first face of the second substrate 120. The color filters may include a red color filter, a green color filter and a blue color filter. The color filters may obtain red (R) light, green (G) light and blue (B) light, respectively.

After a sealing member (not illustrated) may be formed between the first substrate 110 and the second substrate 120, the first substrate 110 and the second substrate 120 may be combined each other while so that maintaining a predetermined space between the first substrate 110 and the second substrate 120. In this case, a cell gap between the first substrate 110 and the second substrate 120 may be sufficiently ensured by a movement control member 152 as described below. Alternatively, an additional member for maintaining the cell gap may be provided between the first substrate 110 and the second substrate 120. For example, a column spacer may be disposed between the first and the second substrates 110 and 120.

Referring now to FIG. 2A, a preliminary liquid crystal structure 148 may be formed at the space provided between the first substrate 110 and the second substrate 120. The preliminary liquid crystal structure 148 may be formed by mixing liquid crystal molecules 154 with an RM, a photopolymerizable monomer, a photoinitiator, etc. The preliminary liquid crystal structure 148 may be coated on the first substrate 110 and/or the second substrate 120 by a printing process, a spray process, etc. Alternatively, the preliminary liquid crystal structure 148 may be injected into the space between the first substrate 110 and the second substrate 120. In example embodiments, contents of the RM, the photopolymerizable monomer, and the photoinitiator in the preliminary liquid crystal structure 148 may be in a range of about 3% to about 30% by weight based on a total weight of the preliminary liquid crystal structure 148. Ranges for the amount contents of the RM, the photopolymerizable monomer, and the photoinitiator in the preliminary liquid crystal structure 148 are not limited thereto, e.g., the range may be about 5% to about 25%, about 10% to about 20%, about 15% to about 25%, etc. For example, the contents of the RM, the photopolymerizable monomer and the photoinitiator in the preliminary liquid crystal structure 148 may vary in accordance with the type of the liquid crystal molecules 154 and/or the type of the RM.

Referring to FIG. 2B, the movement control member 152 may be formed between the first substrate 110 and the second substrate 120 while forming a liquid crystal structure 150 from the preliminary liquid crystal structure 148. The movement control member 152 and the liquid crystal structure 150 may be obtained by performing an exposure process with respect to the preliminary liquid crystal structure 148. For example, the movement control members 152 may be generated in the liquid crystal structure 150 by an ultraviolet (UV) exposure process.

In example embodiments, when light such as UV ray is irradiated to the preliminary liquid crystal structure 148 through the first substrate 110 and/or the second substrate 120, a polymer seed may be generated in the preliminary liquid crystal structure 148 by incident light. The monomers in the preliminary liquid crystal structure 148 may be polymerized based on the polymer seed to grow the movement control member 152 including polymer between the first electrode 130 and the second electrode 140. The movement control member 152 may have various shapes as described above. Further, movement control member 152 may be grown in a direction substantially perpendicular to the first substrate 110 and/or the second substrate 120. In this case, at least one liquid crystal molecule 154 may be partially and/or totally enclosed by the movement control member 152. Namely, at least one liquid crystal molecule 154 may be partially and/or entirely positioned in the movement control member 152. Additionally, a plurality of the liquid crystal molecules 154 may be disposed between adjacent movement control members 152. The dimensions of the movement control member 152 may be adjusted in accordance with the content of the RM in the preliminary liquid crystal structure 148 and the process conditions of the exposure process.

In example embodiments, the exposure process for the liquid crystal structure 150 and the movement control member 152 may be carried out when electric field is not generated between the first substrate 110 and the second substrate 120. The liquid crystal molecules 154 may tend to be aligned along a direction in which the movement control member 152 grows, so that the liquid crystal molecules 154 in the liquid crystal structure 150 may be arranged in a direction substantially perpendicular to the first substrate 110 and/or the second substrate 120.

According to example embodiments, the LCD device having a vertical alignment mode may be obtained by the above-described method. However, the method may be employed or properly modified to manufacture other LCD devices having various modes such as an in plane switching (IPS) mode, a fringe field switching (FFS) mode, a twisted nematic (TN) mode, an electrically controlled birefringence (ECB) mode, etc. Further, although the LCD device having a transmission type is described with reference to FIG. 1 to FIG. 2B, the features and advantages of example embodiments may be employed in LCD devices having a transflective type, a reflective type, etc.

Figure 3:
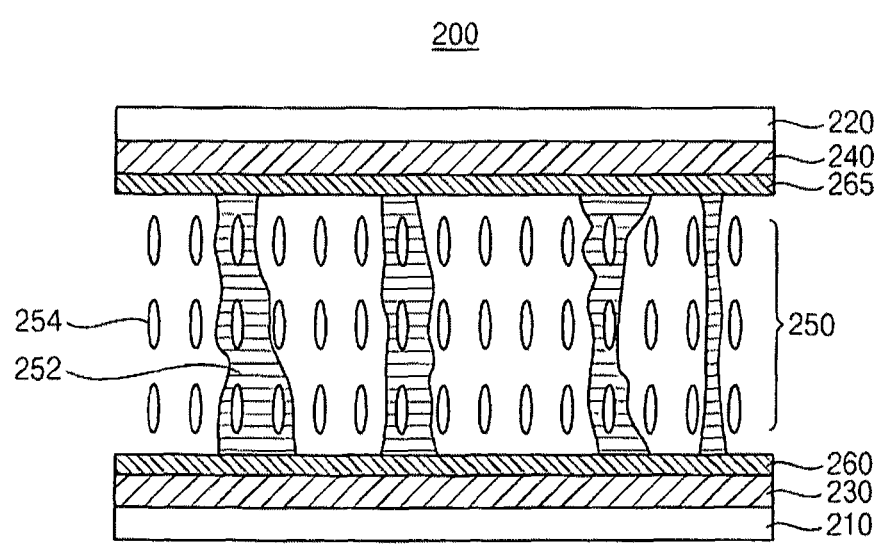
FIG. 3 illustrates a cross-sectional view of an LCD device in accordance with example embodiments.

FIG. 3 is a cross-sectional view illustrating an LCD device in accordance with example embodiments. In the LCD device illustrated in FIG. 3, the LCD device may have a construction substantially the same as or substantially similar to that of the LCD device described with reference to FIG. 1 except that the LCD device may include alignment layers.

Referring to FIG. 3, an LCD device 200 may include a first substrate 210, a second substrate 220, a first electrode 230, a second electrode 240, a liquid crystal structure 250 having liquid crystal molecules 254, a first alignment layer 260, a second alignment layer 265, and a movement control member 252.

The first alignment layer 260 may be disposed on the first electrode 230 positioned on the first substrate 210. The first alignment layer 260 may include a first base material and a first reactive mesogen (RM) dispersed in the first base material. For example, the first base material in the first alignment layer 260 may include polyimide (PI), polyamide (PA), etc.

The second alignment layer 265 may be provided on the second electrode 240 positioned on the second substrate 220. The second electrode 240 may substantially correspond to the first electrode 260. The second alignment layer 265 may include a second base material and a second RM dispersed in the second base material. For example, the second base material in the second alignment layer 265 may include PI, PA, etc. In example embodiments, the second base material and the second RM in the second alignment layer 265 may be substantially the same as or substantially similar to those in the first alignment layer 260. Alternatively, the first base material and the first RM in the first alignment layer 260 may be substantially different from those in the second alignment layer 265.

In some example embodiments, the LCD device 200 may include only one of the first alignment layer 260 and the second alignment layer 265. For example, the first alignment layer 260 may be disposed only on the first electrode 230, or the second alignment layer 265 may be provided only on the second electrode 240.

In example embodiments, the movement control member 252 may have a structure and dimensions substantially the same as or substantially similar to those of the movement control member 152 described with reference to FIG. 1. As described above, when the first alignment layer 260 and/or the second alignment layer 265 includes the RM capable of forming the movement control member 252, the movement control member 252 may be more easily and more rapidly generated in the liquid crystal structure 250. That is, the first alignment layer 260 and/or the second alignment layer 265 may contribute to the formation of the movement control member 252 in the liquid crystal structure 250.

When the RM included in the first alignment layer 260 and/or the second alignment layer 265 is substantially the same as the RM included in the liquid crystal structure 250, a content of the RM for forming the movement control member 252 in the liquid crystal structure 250 may be reduced, and also the process time of an exposure process for forming the movement control member 252 may be decreased. Alternatively, when a content of the RM included in the first alignment layer 260 and/or the second alignment layer 265 is desirably sufficient, the liquid crystal structure 250 may not include the RM for the movement control member 252 because the movement control member 252 may be obtained from, e.g., by using, the first alignment layer 260 and/or the second alignment layer 265.

The movement or the flow of the liquid crystal molecules 254 in the liquid crystal structure 250 may be prevented and/or reduced by the movement control member 252. Therefore, the pooling effect and/or the bruising effect of the LCD device 200 caused by the slopping of the liquid crystal molecules may be effectively prevented and/or considerably reduced. Additionally, the movement control member 252 may serve as a column spacer for ensuring a cell gap of the LCD device 200 so that the LCD device 200 may have a desired cell gap even though an additional column spacer is not provided in the LCD device 200. Furthermore, the liquid crystal molecules 254 may be arranged, e.g., in the initial alignment direction, in a direction substantially in parallel to the direction in which the movement control member 252 is grown. Thus, the liquid crystal molecules 254 may be arranged along a direction substantially perpendicular to the first substrate 210 and/or the second substrate 220. Therefore, when a voltage is not applied to the LCD device 200, the falling time of the liquid crystal molecules 254 may be shortened to improve the response time of the LCD device 200.

Figure 4A:
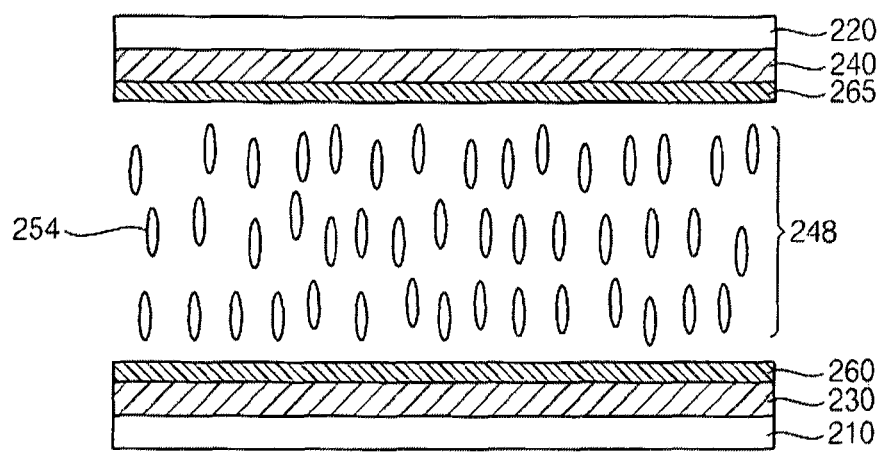
FIGS. 4A and 4B illustrate cross-sectional views showing a method of manufacturing an LCD device in accordance with example embodiments.
Figure 4B:
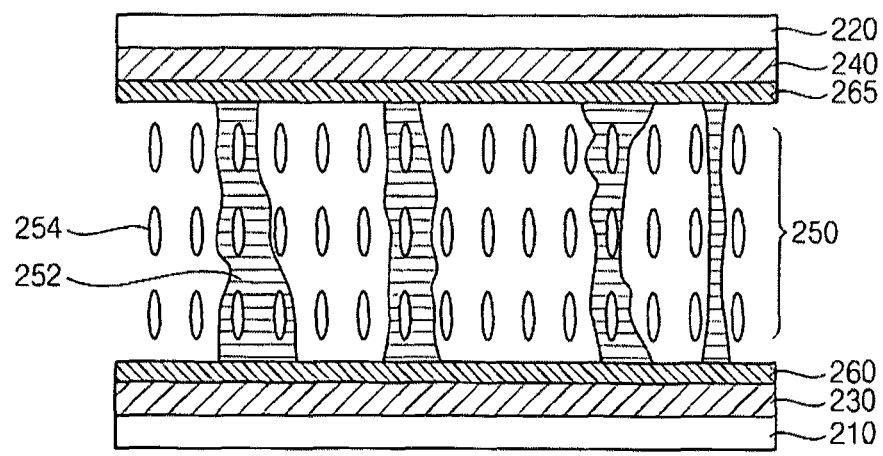

FIGS. 4A and 4B are cross-sectional views illustrating a method of manufacturing an LCD device in accordance with example embodiments. In the method of manufacturing the LCD device illustrated in FIGS. 4A and 4B, the method in FIGS. 4A and 4B may be substantially the same as or substantially similar to the method of manufacturing the LCD device described with reference to FIGS. 2A and 2B except that the method includes a process of forming alignment layers.

Referring to FIG. 4A, a first electrode 230 may be formed on a first substrate 210, and then a first alignment layer 260 may be formed on the first electrode 230. The first electrode 230 may be formed using a transparent insulation material, and the first alignment layer 260 may be formed by coating or spraying a mixture of a first base material and a first RM on the first electrode 230. For example, the first base material of the first alignment layer 260 may include PI, PA, etc. In this case, a content of the first RM in the first alignment layer 260 may be in a range about 1% to about 20% by weight based on a total weight of the first alignment layer 260. Ranges for the content of the first RM in the first alignment layer 260 are not limited thereto, e.g., the range may be within about 5% to about 15%, about 10% to about 15%, about 5% to about 10%, etc.

In some example embodiments, a first heat treatment process and/or a first rubbing treatment process may be additionally performed with respect to the first alignment layer 260 positioned on the first electrode 230. When the LCD device includes the first alignment layer 260, liquid crystal molecules 254 may be aligned by a tilt angle of about 70° to about 90° relative to a surface of the first alignment layer 260.

After a second electrode 240 is formed on a second substrate 220, a second alignment layer 265 may be formed on the second electrode 240. The second electrode 240 may be formed using a transparent insulation material, and the second alignment layer 265 may be formed by coating or spraying a mixture of a second base material and a second RM on the second electrode 240. For example, the second base material of the second alignment layer 265 may include PI, PA, etc. Here, a content of the second RM in the second alignment layer 265 may be in a range of about 1% to about 20% by weight based on a total weight of the second alignment layer 265. Ranges for the content of the second RM in the second alignment layer 265 are not limited thereto, e.g., the range may be within about 5% to about 15%, about 10% to about 15%, about 5% to about 10%, etc.

In some example embodiments, a second heat treatment process and/or a second rubbing treatment process may be additionally executed on the second alignment layer 265 located on the second electrode 240. The liquid crystal molecules 254 may be arranged by the tilt angle of about 70° to about 90° from a surface of the second alignment layer 265 when the LCD device includes the second alignment layer 265.

In some example embodiments, only one of the first alignment layer 260 and the second alignment layer 265 may be formed on the first electrode 230 and/or the second electrode 240. For example, the first alignment layer 260 may be formed only on the first electrode 230, or the second alignment layer 265 may be formed only on the second electrode 240.

A sealing member (not illustrated) may be formed between the first substrate 210 and the second substrate 220 to ensure a space between the first substrate 210 and the second substrate 220 after the first substrate 210 and the second substrate 220 are combined each other. In some example embodiments, a cell gap between the first substrate 210 and the second substrate 220 may be secured by a movement control member 252. Alternatively, an additional cell gap holding member such as a column spacer may also be provided between the first substrate 210 and the second substrate 220 to ensure the cell gap of the LCD device.

A preliminary liquid crystal structure 248 including the liquid crystal molecules 254 may be formed in the space between the first substrate 210 and the second substrate 220. The preliminary liquid crystal structure 248 may include all of or at least one of the liquid crystal molecules 254, a RM, a photopolymerizable monomer, a photoinitiator, etc. In an example embodiment, the preliminary liquid crystal structure 248 may not include a RM. The preliminary liquid crystal structure 248 may be formed on the first substrate 210 and/or the second substrate 220 by a printing process, a spray process, etc. Alternatively, the preliminary liquid crystal structure 248 may be injected into the space between the first substrate 210 and the second substrate 220.

Referring to FIG. 4B, the movement control member 252 and the liquid crystal structure 250 may be formed by performing an exposure process about the first alignment layer 260, the second alignment layer 265, and the preliminary liquid crystal structure 248. For example, the movement control member 252 and the liquid crystal structure 250 may be obtained by a UV exposure process. That is, the preliminary liquid crystal structure 248 may be exposed to UV light so as to form the movement control member 252 and the liquid crystal structure 250 from the preliminary liquid crystal structure 248.

In example embodiments, when light such as UV ray are irradiated to the first alignment layer 260, the second alignment layer 265 and/or the preliminary liquid crystal structure 248, a polymer seed may be generated from the first alignment layer 260, the second alignment layer 265 and/or the preliminary liquid crystal structure 248. The polymer seed may enable the monomers in the preliminary liquid crystal structure 248 polymerize to obtain the movement control member 252 while the liquid crystal structure 250 is formed from the preliminary liquid crystal structure 248. That is, the movement control member 252 may be generated from the first alignment layer 260, the second alignment layer 265 and/or the preliminary liquid crystal structure 248. As described above, at least one liquid crystal molecule 254 may be partially and/or totally dispersed in the movement control member 252. Additionally, at least one liquid crystal molecule 254 may be partially and/or entirely enclosed by the movement control member 252.

When the first alignment layer 260 and/or the second alignment layer 265 include the RM substantially the same as or substantially similar to the RM in the preliminary liquid crystal structure 248, the movement control member 252 may be more easily and rapidly generated in the liquid crystal structure 250. In some example embodiments, when the first alignment layer 260 and/or the second alignment layer 265 has a sufficient content of RM, the RM for the movement control member 252 may not be included in the preliminary liquid crystal structure 248. Namely, the movement control member 252 may be generated only from the first alignment layer 260 and/or the second alignment layer 265. Further, a plurality of the movement control members 252 may be formed in the liquid crystal structure 250 to make contact with the first alignment layer 260 and/or the second alignment layer 265. Alternatively, the movement control members 252 may be separated from the first alignment layer 260 and/or the second alignment layer 265 by predetermined distances.

Figure 5:
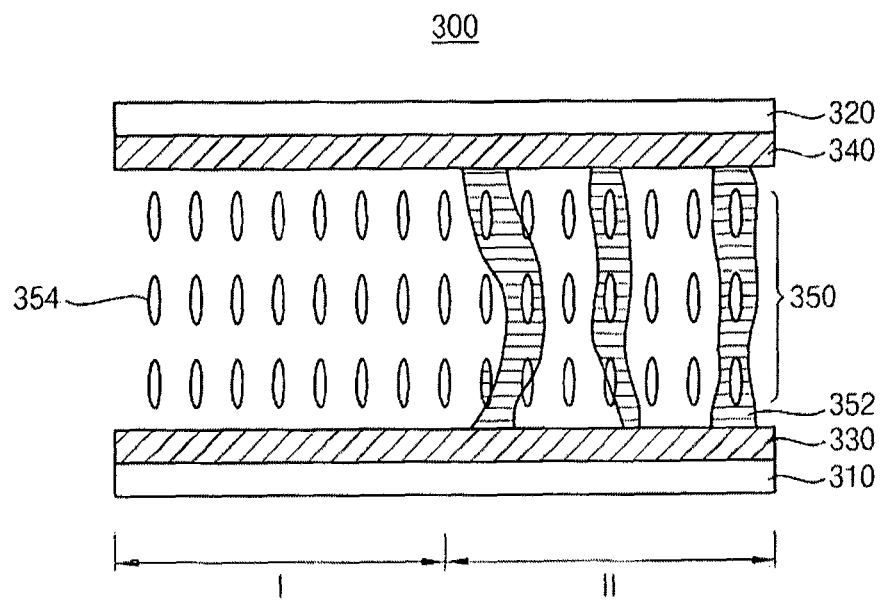
FIG. 5 illustrates a cross-sectional view of an LCD device in accordance with example embodiments.

FIG. 5 is a cross-sectional view illustrating an LCD device in accordance with some example embodiments. The LCD device illustrated in FIG. 5 may have a construction substantially the same as or substantially similar to that of the LCD device described with reference to FIG. 1 except that the LCD device may include multi domains therein.

Referring to FIG. 5, an LCD device 300 may include a first substrate 310, a second substrate 320, a first electrode 330, a second electrode 340, a liquid crystal structure 350, and a movement control member 352.

The LCD device 300 may have a first region I and a second region II. Here, the movement control member 352 may be disposed in the second region II of the LCD device 300. For example, liquid crystal molecules 354 may be positioned in the first region I only whereas the liquid crystal molecules 354 and the movement control member 352 may be located in the second region II.

In example embodiments, the first region I of the LCD device 300 where the movement control member 352 is not disposed may serve as a main domain having relatively low gamma values of R•G•B. A threshold voltage of the LCD device 300 may be increased by the movement control member 352 in the second region II, so that the second region II of the LCD device 300 may function as a sub-domain having relatively high gamma values of R•G•B. That is, the LCD device 300 may have the multi domains in accordance with the position of the movement control member 352. Therefore, a side visibility of the LCD device 300 may be improved without decreasing an aperture ratio of the LCD device 300.

Domains of an LCD device may be divided using electrical methods such as a space separation method or a time separation method. In the space separation method, the domains of the LCD device may be obtained by changing constructions of electrodes in the LCD device. The time separation method may provide the domains of the LCD device by dividing the time of applied voltages to the electrodes in the LCD device. However, these methods may result in reduced aperture ratios. Thus, the LCD device may have a considerably reduced aperture ratio so that the LCD device may not display an image with a high resolution even though the LCD device has multi domains. Therefore, according to example embodiments, the LCD device 300 may have divided multi domains using the movement control member 352 including polymer such that the LCD device 300 may have enhanced front visibility and side visibility to display an image with a high resolution by reducing the difference of refraction indices of the liquid crystal structure 350 without decreasing the aperture ratio of the LCD device 300.

As described above, the movement and/or local flow of the liquid crystal molecules 354 may be effectively prevented and/or reduced, and also a cell gap of the LCD device 300 may be desirably maintained without any additional members when the LCD device 300 includes the movement control members 352.

Figure 6A:
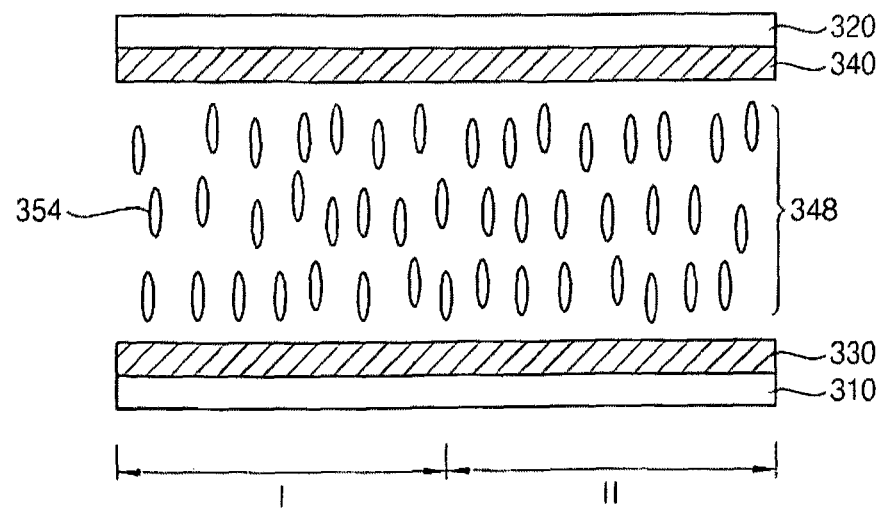
FIGS. 6A and 6B illustrate cross-sectional views showing a method of manufacturing an LCD device in accordance with example embodiments.
Figure 6B:
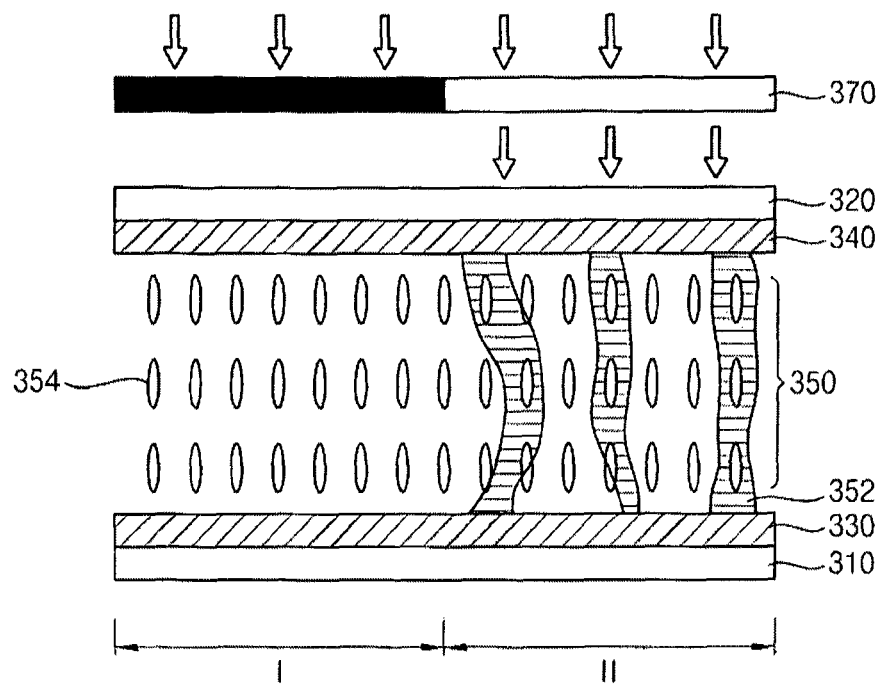

FIGS. 6A and 6B are cross-sectional views illustrating a method of manufacturing an LCD device in accordance with example embodiments. In the method of manufacturing the LCD device illustrated in FIGS. 6A and 6B, the method of FIGS. 6A and 6B may be substantially the same as or substantially similar to the method of manufacturing the LCD device described with reference to FIGS. 2A and 2B except a region in which a movement control member is formed.

Referring to FIG. 6A, a first electrode 330 may be formed on a first substrate 310, and a second electrode 340 may be formed on a second substrate 320. After a sealing member (not illustrated) may be disposed between the first substrate 310 and the second substrate 320, the first substrate 310 may be combined with the second substrate 320 using the sealing member while providing a predetermined space between the first substrate 310 and the second substrate 320. In example embodiments, each of the first substrate 310 and the second substrate 320 may have a first region I and a second region II.

A preliminary liquid crystal structure 348 may be formed in the space between the first and the second substrates 310 and 320. The preliminary liquid crystal structure 348 may be formed using a mixture of a RM, a photopolymerizable monomer, a photoinitiator, etc. In example embodiments, a content of the RM, the photopolymerizable monomer and the photoinitiator in the preliminary liquid crystal structure 348 may be in a range of about 3% to about 30% by weight based on a total weight of the preliminary liquid crystal structure 348. Ranges are not limited thereto, e.g., the range may be about 5% to about 25%, about 10% to about 20%, about 15% to about 25%, etc.

Referring to FIG. 6B, a mask 370 may be placed over the second substrate 320, and then the preliminary liquid crystal structure 348 may be exposed to light such as UV ray using the mask 370. Hence, at least one movement control member 352 may be generated in the second region II between the first and the second substrates 310 and 320. Additionally, a liquid crystal structure 350 may be formed from the preliminary liquid crystal structure 348. That is, the preliminary liquid crystal structure 348 may be changed into the liquid crystal structure 350 while generating the movement control member 352.

In example embodiments, the mask 370 may have a light shielding region and a transmissive region. The light shielding region of the mask 370 may be disposed over the first region I between the first and the second substrates 310 and 320. The transmissive region may be positioned over the second region II of the first and the second substrates 310 and 320. Incident light to the mask 370 having the light shielding region and the transmissive region may not be irradiated into a portion of the preliminary liquid crystal structure 348 located in the first region I whereas light may reach a portion of the preliminary liquid crystal structure 348 located in the second region II. Therefore, a polymer seed may be generated in the portion of the preliminary liquid crystal structure 348 in the second region II, and thus the photopolymerizable monomers in the preliminary liquid crystal structure 348 may be polymerized using the polymer seed to form the movement control member 352 including polymer in the second region II between the first and the second substrates 310 and 320.

According to example embodiments, the movement control member 352 may be obtained in a desired portion of the liquid crystal structure 350 using the mask 370 that includes regions having different light transmittances, respectively. Here, the movement control member 352 may have a shape and dimensions substantially the same as or substantially similar to those of the movement control member described with reference to FIG. 1. The first region I of the LCD device which does not include the movement control member 352 may serve as a main domain having relatively low gamma values of R•G•B, and the second region II of the LCD device including the movement control members 352 may function as a sub-domain having relatively high gamma values of R•G••B. As a result, the LCD device 300 may have a multi domain structure including the main domain and the sub-domain.

Figure 7:
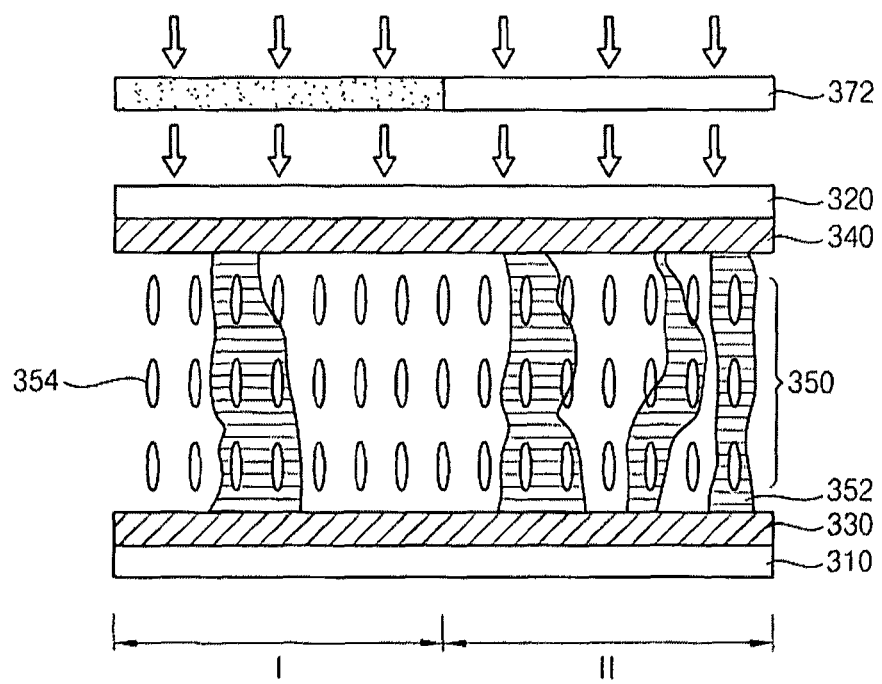
FIG. 7 illustrates a cross-sectional view showing a method of manufacturing an LCD device in accordance with some example embodiments.

FIG. 7 is a cross-sectional view illustrating a method of manufacturing an LCD device in accordance with some example embodiments. The method of manufacturing the LCD device illustrated in FIG. 7 may be substantially the same as or substantially similar to the method of manufacturing the LCD device described with reference to FIGS. 6A and 6B except that a constitution of a mask may be varied.

Referring to FIG. 7, a preliminary liquid crystal structure may be exposed to light using a halftone mask or a halftone slit mask having different light transmittances, so that a liquid crystal structure 350 and a movement control member 352 may be formed between a first substrate 310 and a second substrate 320. That is, a difference of exposed amounts between a first region I and a second region II of the LCD device may be caused by the mask 372 having a transmissive region and a transmittance control region in an exposure process performed about the preliminary liquid crystal structure. Thus, there is induced a density difference of polymerized polymer in the preliminary liquid crystal structure between the first and the second regions I and II.

As for the mask 372 having the transmissive region and the transmittance control region, the transmittance of light passing the mask 372 may be adjusted in accordance with process conditions for forming the movement control member 352. For example, the transmittance control region of the mask 372 may have a transmittance in a range of about 30% to about 70% relative to light initially irradiated into the mask 372. Therefore, a few movement control members 352 may be generated in the first region I having a relatively low density of the polymer, whereas relatively many movement control members 352 may be formed in the second region II having a relatively high density of the polymer. The first region I of the LCD device having the relatively low density of the polymer may serve as a main domain having low gamma values of R•G•B. The second region II of the LCD device having the relatively high density of the polymer may function as a sub-domain having high gamma values of R•G•B.

According to example embodiments, the number or the density of the movement control members 352 generated in the first and the second regions and II may be controlled using the mask 372, which may be the halftone mask or the halftone slit mask. Thus, the LCD device may have multi domains, and also the movement and/or the local flow of liquid crystal molecules 354 in the LCD device may be effectively prevented and/or reduced while sufficiently ensuring a cell gap of the LCD device.

Figure 8:
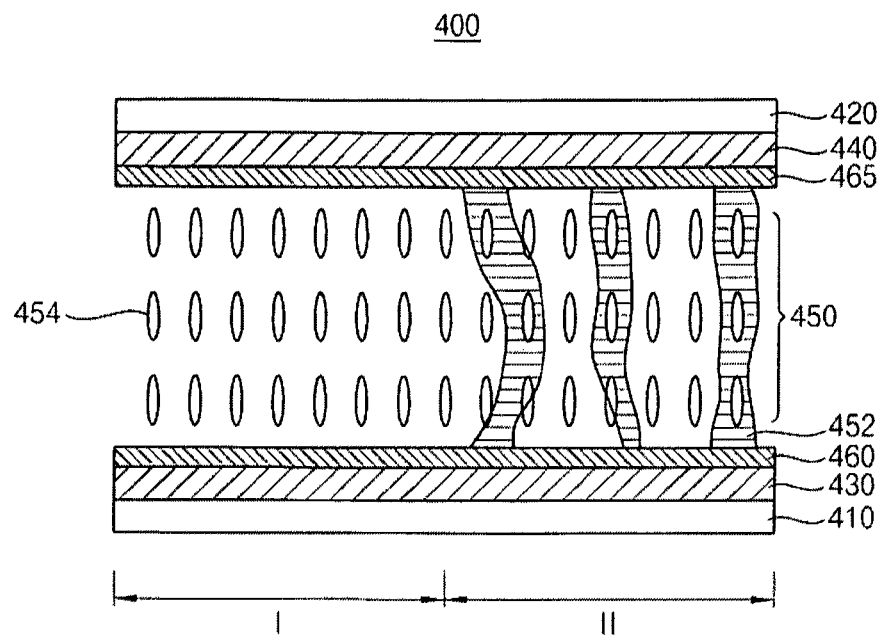
FIG. 8 illustrates a cross-sectional view of an LCD device in accordance with example embodiments.

FIG. 8 is a cross-sectional view illustrating an LCD device in accordance with some example embodiments. The LCD device illustrated in FIG. 8 may have a construction substantially the same as or substantially similar to that of the LCD device described with reference to FIG. 1 except alignment layers.

Referring to FIG. 8, an LCD device 400 may include a first substrate 410, a second substrate 420, a first electrode 430, a second electrode 440, a first alignment layer 460, a second alignment layer 465, a liquid crystal structure 450, and a movement control member 452.

The first electrode 430 and the first alignment layer 460 may be successively disposed on the first substrate 410. The second electrode 440 and the second alignment layer 465 may be sequentially provided on the second substrate 420. The first electrode 430 and the first alignment layer 460 may substantially correspond to the second electrode 440 and the second alignment layer 465, respectively.

The liquid crystal structure 450 and the movement control member 452 may be positioned between the first alignment layer 460 and the second alignment layer 465. In some example embodiments, the LCD device 400 may include only one of the first alignment layer 460 and the second alignment layer 465 as described above.

The LCD device 400 may have a first region I and a second region II. The first region I of the LCD device 400 may not have the movement control member 452 whereas the second region II of the LCD device 400 may include at least one movement control member 452. As described above, the first region I, which does not include the movement control member 452, may function as a main domain of the LCD device 400 having relatively low gamma values of R•G•B. The second region II including the movement control member 452 may serve as a sub-domain of the LCD device 400 having relatively high gamma values of R•G•B. Because the LCD device 400 may have a multi domain structure without reducing the aperture ratio of the LCD device 400, the front visibility and the side visibility of the LCD device 400 may be efficiently improved.

Additionally, when the first substrate 410 and/or the second substrate 420 are pressed by a user, the movement and/or the flow of the liquid crystal molecules 454 may be prevented and/or reduced by the movement control member without any column spacer or a supporting member. Therefore, the pooling effect and/or the bruising effect of the LCD device 400 caused by the slopping of the liquid crystal molecules 454 may be effectively reduced and/or prevented while the user presses the LCD device 400 to operated the LCD device 400. Furthermore, the movement control member 452 may serve as a column spacer of the LCD device 400 between the first substrate 410 and the second substrate 420, so that the cell gap of the LCD device 400 may be sufficiently maintained without an additional column spacer.

Figure 9A:
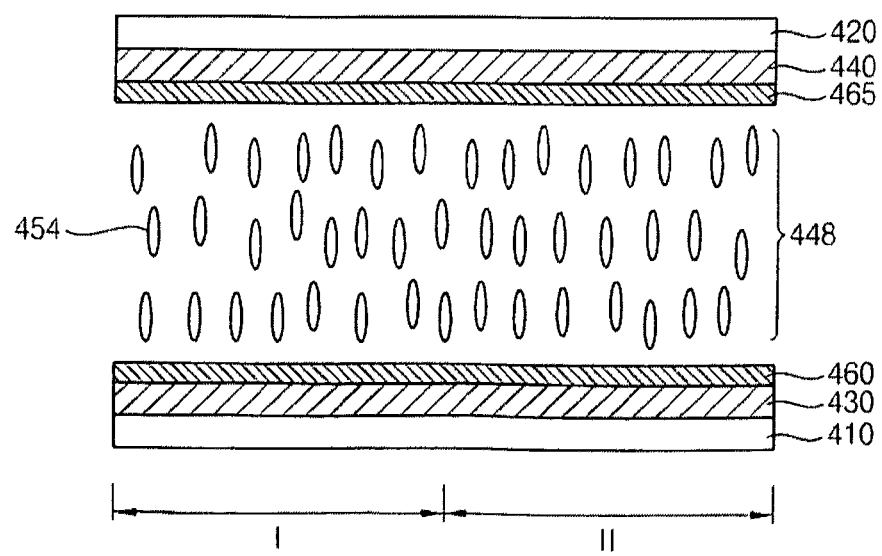
FIGS. 9A and 9B illustrate cross-sectional views showing a method of manufacturing an LCD device in accordance with example embodiments.
Figure 9B:
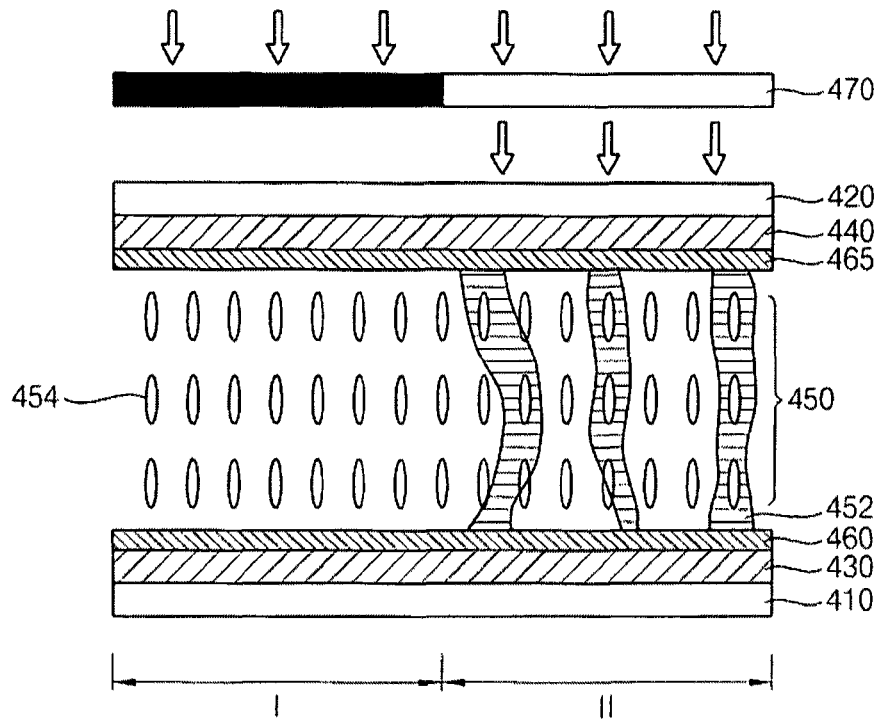

FIGS. 9A and 9B are cross-sectional views illustrating a method of manufacturing an LCD device in accordance with example embodiments. In the method of manufacturing the LCD device illustrated in FIGS. 9A and 9B may be substantially the same as or substantially similar to the method of manufacturing the LCD device described with reference to FIGS. 6A and 6B except that processes for forming alignment layers are varied.

Referring to FIG. 9A, a first electrode 430 may be formed on a first substrate 410, and then a first alignment layer 460 may be formed on the first electrode 430. After a second electrode 440 may be formed on a second substrate 420, a second alignment layer 465 may be formed on the second electrode 440. Each of the first alignment layer 460 and the second alignment layer 465 may include a base material and a RM. The base material in each of the first and the second alignment layers 460 and 465 may include PI, PA, etc. A content of the RM included in each of the first and the second alignment layers 460 and 465 may be in a range of about 1% to about 20% by weight based on a total weight of the base material. Ranges are not limited thereto, e.g., the ranges may be about 5% to about 15%, about 10% to about 15%, and about 5% to about 10%.

In some example embodiments, only one alignment layer may be formed on the first electrode 430 or the second electrode 440. For example, only the first alignment layer 460 may be formed on the first electrode 430, or the second alignment layer 465 may be formed on the second electrode 440.

A sealing member (not illustrated) may be formed between the first substrate 410 and the second substrate 420. The first substrate 410 may be combined with the second substrate 420 using the sealing member while ensuring a desired space between the first substrate 410 and the second substrate 420.

A preliminary liquid crystal structure 448 may be formed in the space between the first substrate 410 and the second substrate 420. The preliminary liquid crystal structure 448 may include liquid crystal molecules 454, a RM, a photopolymerizable monomer, a photoinitiator, etc. In some example embodiments, when a content of the RM in each of the first alignment layer 460 and the second alignment layer 465 is desirably sufficient, the preliminary liquid crystal structure 448 may not include the RM. For example, when the content of the RM in each of the first alignment layer 460 and the second alignment layer 465 is about 20% by weight, the preliminary liquid crystal structure 448 may not include the RM for forming a movement control member 452.

Referring to FIG. 9B, an exposure process may be performed about the preliminary liquid crystal structure 448, the first alignment layer 460 and/or the second alignment layer 465. The exposure process may include a UV exposure process.

According to example embodiments, the exposure process may be carried out using a mask 470 having a light shielding region and a transmissive region. The mask 470 may be disposed over the second substrate 420. In this case, a first region I and a second region II of the LCD device may be located under the light shielding region and the transmissive region of the mask 470, respectively. Light such as UV light may pass through the transmissive region of the mask 470, and may reach the first alignment layer 460, the second alignment layer 465 and/or the preliminary liquid crystal structure 448 positioned in the second region II of the LCD device. Hence, a photopolymerization reaction may occur in the first alignment layer 460, the second alignment layer 465 and/or the preliminary liquid crystal structure 448 to thereby generate the movement control member 452 in the second region II of the LCD device.

However, light may not be irradiated into the first region I of the first and the second substrates 410 and 420 because the first region I of the first and the second substrates 410 and 420 may be located under the light shielding region of the mask 470. A photopolymerization reaction may not occur in the first alignment layer 460, the second alignment layer 465 and/or the preliminary liquid crystal structure 448 formed in the first region I. Therefore, the first region I of the LCD device may have the liquid crystal molecules 454 in the liquid crystal structure 450 only, whereas the second region II of the LCD device may include the liquid crystal molecules 454 and at least one movement control member 452.

The liquid crystal molecules 454 may be orientated along a growth direction of the movement control member 452 in the second region II of the LCD device. The liquid crystal molecules 454 may be partially and/or totally dispersed between adjacent movement control members 452. As described above, the first and the second regions I and II of the LCD device may respectively serve as a main domain and a sub-domain in accordance with the position of the movement control member 452.

Figure 10:
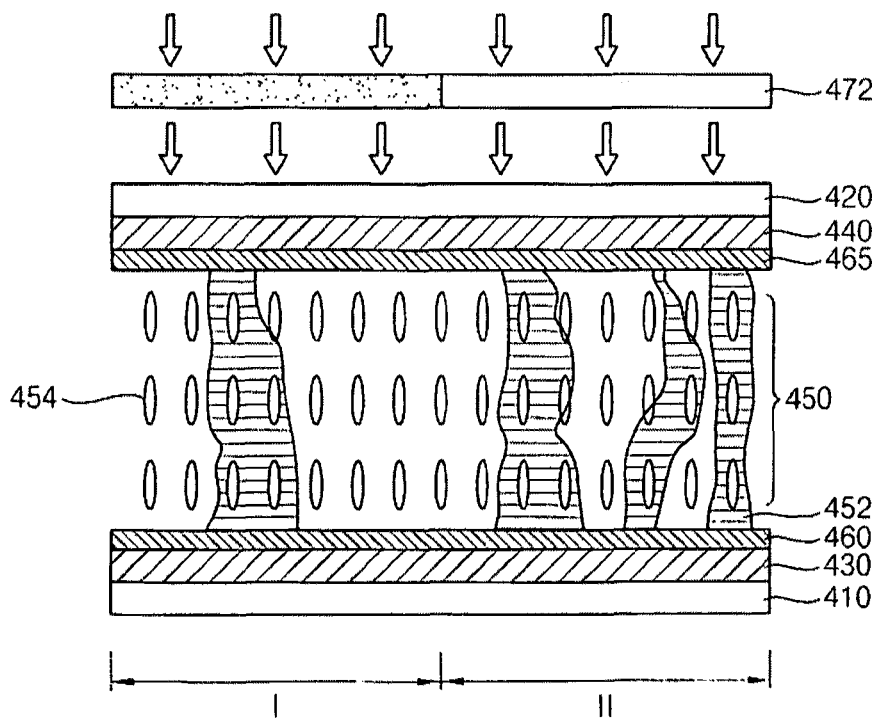
FIG. 10 illustrates a cross-sectional view showing a method of manufacturing an LCD device in accordance with some example embodiments.
Figure 11A:
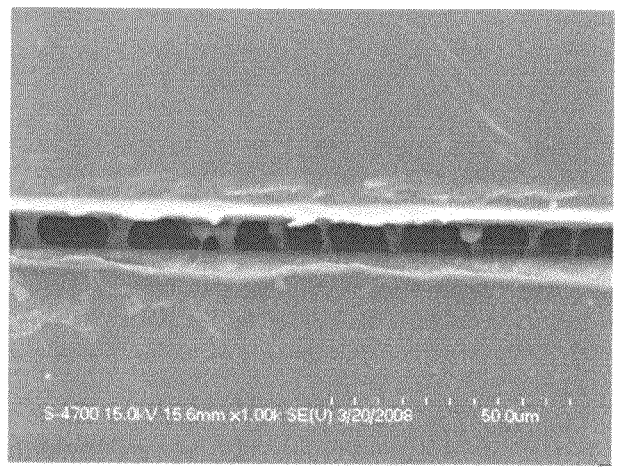
FIGS. 11A to 11D show views from an electron microscope of movement control members formed in liquid crystal structures in accordance with example embodiments.
Figure 11B:
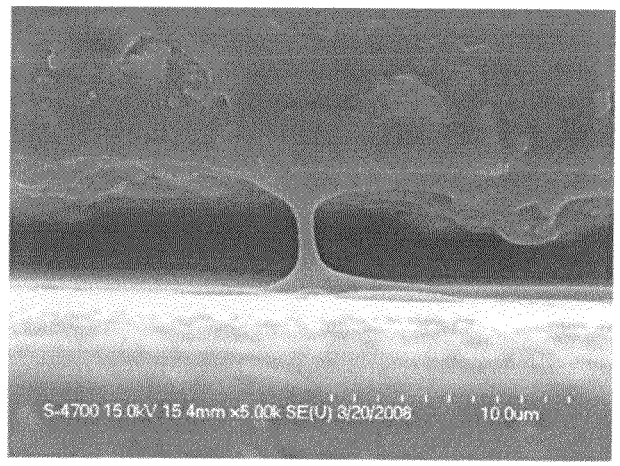
Figure 11C:
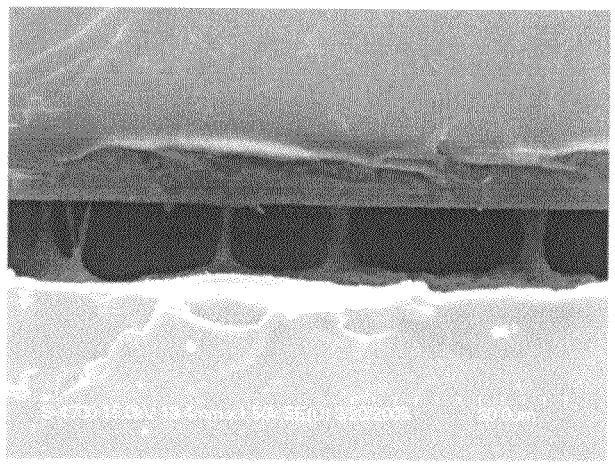
Figure 11D:
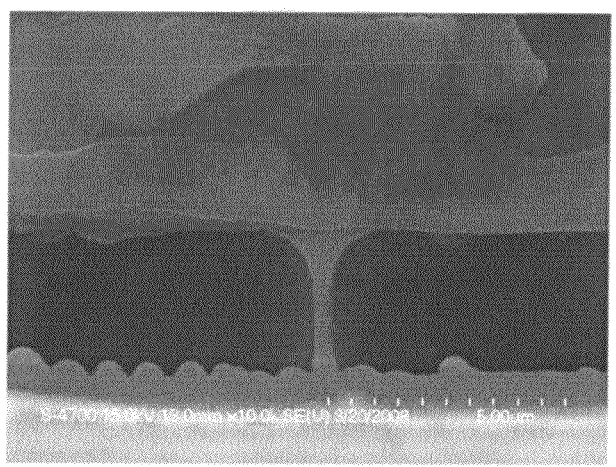

FIG. 10 is a cross-sectional view illustrating a method of manufacturing a LCD device in accordance with some example embodiments. The method of manufacturing the LCD device illustrated in FIG. 10 may be substantially the same as or substantially similar to the method of manufacturing the LCD device described with reference to FIGS. 9A and 9B except that a construction of a mask may be varied.

Referring to FIG. 10, a liquid crystal structure 450 and a movement control member 452 may be formed by exposing a preliminary liquid crystal structure, a first alignment layer 460 and/or a second alignment layer 465 to light using a mask 472 such as a halftone mask, a halftone slit mask, etc. The halftone mask may have a transmissive region and a transmittance control region. The movement control member 452 may be generated in both of a first region I and a second region II of a first substrate 410 and a second substrate 420. The transmittance control region of the mask 472 may have a predetermined light transmittance in accordance with process conditions of the exposure process for forming the movement control member 452. For example, the light transmittance of the transmittance control region of the mask 472 may be in a range of about 30% to about 70% based on an amount of initial light incident onto the mask 472.

In example embodiments, a difference of polymer densities between the first region I and the second region II of the LCD device may occur in the exposure process using the mask such as the halftone mask or the halftone-slit mask. That is, a few movement control members 452 may be grown in the first region I, so that the first region I of the LCD device may have a relatively low density of polymer. However, relatively much movement control members 352 may be generated in the second region II, such that the second region II of the LCD device may have a relatively high density of polymer. In the LCD device according to example embodiments, the first region I having the relatively low density of polymer may serve as a main domain having low gamma values of R•G•B, and the second region II having the relatively high density of polymer may function as a sub-domain having high gamma values of R•G•B.

FIGS. 11A to 11D are views from an electron microscope showing movement control members formed in liquid crystal structures in accordance with example embodiments.

As illustrated in FIGS. 11A to 11D, at least one movement control member may be generated in liquid crystal structures by various exposure processes. In the LCD device, the view angle may be improved by a multi domain structure that includes more than two thin film transistors or by changing constructions of electrodes. However, the aperture ratio of the LCD device may be considerably reduced by such methods, and also processes of forming the LCD device may be complicated. Thus, the LCD device may not ensure an image with a high resolution. Therefore, according to example embodiments, at least one movement control member may be obtained by a simplified exposure process, so that an LCD device including the movement control member may have a multi domain structure that includes a main domain and a sub-domain without requiring any additional transistors or changing of the construction of electrodes.

The main domain and the sub-domain of the LCD device according to example embodiments may have different gamma values of R•G•B, so that a refractive index difference of a liquid crystal structure between the main domain and the sub-domain may be reduced to improve the front visibility and the side visibility of the LCD device. Furthermore, at least one movement control member may prevent and/or reduce the movement and/or the flow of liquid crystal molecules in the liquid crystal structure, such that the bruising effect and/or the pooling effect of the LCD device may be efficiently prevented.

By way of summation and review, when a user touches or presses a substrate of a LCD device, liquid crystal molecules may be arranged along a direction in which the user presses the device even though an electric field is not applied. Hence, a blemish or a dark mark may occur on a display screen, and also the liquid crystal molecules may not be rapidly restored toward an initial orientation or adjacent liquid crystal molecules may also be continuously displaced along the portion pressurized by the user, which is called a bruising effect or a pooling effect. Supporting frames or spacers may be additionally arranged between two substrates so as to prevent the bruising effect or the pooling effect. However, the construction of this LCD device may be more complicated and processes for manufacturing the device with the supporting frames or the spacers may be difficult.

In an LCD device having a vertical alignment (VA) mode in which liquid crystal molecules may be arranged along a direction perpendicular to a substrate, the front visibility of the LCD device may be lower than the side visibility thereof. Thus, a multi domain structure may be employed using electrically separated thin film transistor to improve the viewing angle. However, such an LCD device may have a deteriorated aperture ratio so that it may not display an image with high resolution.

In contrast, example embodiments provide an LCD device and a method of manufacturing the LCD device that include a movement control member to ensure improved visibility while reducing and/or preventing bruising effect and/or pooling effect. In particular, according to example embodiments, the LCD device may include at least one movement control member for reducing and/or preventing the movement of the liquid crystal molecules in the liquid crystal structure so that the pooling effect of the LCD device may be effectively prevented while a user touches the first substrate and/or the second substrate to operate the LCD device. Additionally, the movement control member including polymer may serve as a column spacer for maintaining the cell gap of the LCD device such that the LCD device according to example embodiments may ensure desired cell gap without an additional column spacer.

When the LCD device according to example embodiments includes the movement control member, the liquid crystal molecules may be arranged along a direction substantially the same as or substantially similar to a direction in which the movement control member is extended. Therefore, the LCD device according to example embodiments may have reduced response speed by reducing the falling time of the liquid crystal molecules when voltage is not applied to the LCD device. Furthermore, the LCD device according to example embodiments may have improved side visibility in accordance with the position of the movement control member because the LCD device may have multi domains including a main domain and a sub-domain by the movement control member.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A liquid crystal display device, comprising:
   a first substrate;
   a first electrode on the first substrate;
   a second substrate opposed to the first substrate;
   a second electrode on the second substrate, the second electrode corresponding to the first electrode;
   a liquid crystal structure between the first electrode and the second electrode, the liquid crystal structure including a plurality of liquid crystal molecules; and
   a plurality of movement control members in the liquid crystal structure that restricts a movement of the liquid crystal molecules, wherein at least one liquid crystal molecule is partially or entirely dispersed in at least one of the movement control members, wherein the liquid crystal molecules are arranged in a same direction as a direction in which the at least one movement control member extends, and wherein:
   a first number of the movement control members are in a first region corresponding to a first range of gamma values of one or more colors,
   a second number of the movement control members are in a second region of adjacent the first region, the second number of movement control members correspond to a second range of gamma values of one or more colors different from the first range of gamma values, and
   the first number of movement control members is different from the second number of movement control members.

2. The liquid crystal display device as claimed in claim 1, wherein the movement control members include a polymer.

3. The liquid crystal display device as claimed in claim 1, wherein the movement control members maintain a predetermined cell gap of the liquid crystal display device.

4. The liquid crystal display device as claimed in claim 1, wherein each of the movement control members has one of a pillar shape, a circular cylindrical shape, an elliptical cylindrical shape, or a polygonal cylindrical shape.

5. The liquid crystal display device as claimed in claim 1, wherein the plurality of movement control members are spaced apart in the liquid crystal structure in a predetermined pattern.

6. The liquid crystal display device as claimed in claim 5, wherein:
   at least one of the plurality of movement control members contacts one of the first electrode and the second electrode, or
   at least one of the plurality of movement control members is spaced apart from one of the first electrode and the second electrode.

7. The liquid crystal display device as claimed in claim 1, wherein an upper portion, a middle portion, and a lower portion of at least one of the movement control members has substantially a same width.

8. The liquid crystal display device as claimed in claim 1, wherein at least one of an upper portion, a middle portion, or a lower portion of at least one of the movement control members has a width different from widths of other portions of the at least one movement control member.

9. The liquid crystal display device as claimed in claim 1, wherein the at least one of the movement control members has an irregular shape.

10. The liquid crystal display device as claimed in claim 1, wherein the at least one movement control member has irregularly shaped side walls.

11. The liquid crystal display device as claimed in claim 1, wherein the movement control members are spaced from one another at substantially a same interval.

12. The liquid crystal display device as claimed in claim 1, wherein the movement control members are spaced at different or irregular intervals.

13. The liquid crystal display device as claimed in claim 1, wherein the movement control members have different sizes.

14. The liquid crystal display device as claimed in claim 13, wherein the difference sizes are different widths.

15. The liquid crystal display device as claimed in claim 1, wherein at least one liquid crystal molecule in the liquid crystal structure is dispersed in each of the movement control members.

16. The liquid crystal display device as claimed in claim 1, wherein:
   the at least one movement control member has a first end and a second end, and
   a distance between the first end and the second end is substantially equal to a distance between the first and second electrodes.

17. The liquid crystal display device as claimed in claim 1, wherein the first range of gamma values is lower than the second range of gamma values.

18. The liquid crystal display device as claimed in claim 17, wherein the first number is zero and the second number is one or more.

19. The liquid crystal display device as claimed in claim 17, wherein the first number is greater than or equal to one and the second number is greater than one.

20. The liquid crystal display device as claimed in claim 1, wherein the liquid crystal molecules are arranged in the same direction as the direction in which the at least one movement control member extends when a voltage is not applied to the first and second electrodes.

21. A liquid crystal display device comprising:
   a first substrate;
   a first electrode on the first substrate;
   a second substrate opposed to the first substrate;
   a second electrode on the second substrate, the second electrode corresponding to the first electrode;
   an alignment layer on the first electrode or the second electrode;
   a liquid crystal structure between the first electrode and the second electrode, the liquid crystal structure including a plurality of liquid crystal molecules; and
   a plurality of movement control members in the liquid crystal structure that restricts a movement of the liquid crystal molecules, wherein at least one liquid crystal molecule is partially or entirely dispersed in the at least one movement control member and wherein:
   a first number of the movement control members are in a first region corresponding to a first range of gamma values of one or more colors,
   a second number of the movement control members are in a second region of adjacent the first region, the second number of movement control members correspond to a second range of gamma values of one or more colors different from the first range of gamma values, and
   the first number of movement control members is different from the second number of movement control members.

22. The liquid crystal display device as claimed in claim 21, wherein the alignment layer includes a reactive mesogen and the movement control members include reactive mesogen derived from the alignment layer.

23. The liquid crystal display device as claimed in claim 21, wherein the first region has a relatively low density of polymer and the second region has a relatively high density of polymer.

24. The liquid crystal display device as claimed in claim 21, wherein the number of the movement control members in the second region is larger than the number of the movement control members in the first region.

25. A method of manufacturing a liquid crystal display device, comprising:
forming a first electrode on a first substrate;
forming a second electrode on a second substrate opposed to the first substrate;
combining the first substrate with the second substrate;
forming a preliminary liquid crystal structure between the first substrate and the second substrate; and
exposing the preliminary liquid crystal structure to form a liquid crystal structure and to form a plurality of movement control members in the liquid crystal structure, the liquid crystal structure including liquid crystal molecules that are partially or entirely dispersed in the at least one movement control member, wherein the liquid crystal molecules are arranged in a same direction as a direction in which the at least one movement control member extends and wherein:
a first number of the movement control members are in a first region corresponding to a first range of gamma values of one or more colors,
a second number of the movement control members are in a second region of adjacent the first region, the second number of movement control members correspond to a second range of gamma values of one or more colors different from the first range of gamma values, and
the first number of movement control members is different from the second number of movement control members.

26. The method as claimed in claim 25, wherein the preliminary liquid crystal structure includes the liquid crystal molecules, a reactive mesogen, a photopolymerizable monomer, and a photoinitiator.

27. The method as claimed in claim 26, wherein a content of the reactive mesogen, the photopolymerizable monomer, and the photoinitiator is in a range of about 3% to about 30% by weight based on a total weight of the preliminary liquid crystal structure.

28. The method as claimed in claim 25, wherein exposing the preliminary liquid crystal structure to form the movement control member includes performing an ultraviolet (UV) exposure process on the preliminary liquid crystal structure.

29. The method as claimed in claim 25, wherein exposing the preliminary liquid crystal structure includes:
placing a mask having a light shielding region and a transmissive region over the second substrate; and
forming the movement control members in a portion of the liquid crystal structure below the transmissive region of the mask by exposing the preliminary liquid crystal structure to a light using the mask.

30. The method as claimed in claim 25, wherein exposing the preliminary liquid crystal structure includes:
placing a mask having a transmittance control region and a transmissive region over the second substrate; and
forming the movement control members in the liquid crystal structure by exposing the preliminary liquid crystal structure to a light using the mask.

31. The method as claimed in claim 30, wherein the number of the movement control members formed in a portion of the liquid crystal structure below the transmissive region is larger than the number of the movement control members formed in a portion of the liquid crystal structure below the transmittance control region, and wherein the transmissive region corresponds to the second region and the transmittance control region corresponds to the first region.

32. A method of manufacturing a liquid crystal display device comprising:
forming a first electrode on a first substrate;
forming a second electrode on a second substrate opposed to the first substrate;
forming an alignment layer on the first electrode or the second electrode;
combining the first substrate with the second substrate;
forming a preliminary liquid crystal structure between the first substrate and the second substrate; and
exposing the preliminary liquid crystal structure to form a liquid crystal structure and to form a plurality of movement control members in the liquid crystal structure, the liquid crystal structure including one or more liquid crystal molecules that are partially or entirely dispersed in the at least one movement control member, wherein:
a first number of the movement control members are in a first region corresponding to a first range of gamma values of one or more colors,
a second number of the movement control members are in a second region of adjacent the first region, the second number of movement control members correspond to a second range of gamma values of one or more colors different from the first range of gamma values, and
the first number of movement control members is different from the second number of movement control members.

33. The method as claimed in claim 32, wherein the alignment layer includes a base material and a reactive mesogen.

34. The method as claimed in claim 33, wherein the movement control members are formed from at least one of the alignment layer and the preliminary liquid crystal structure.

* * * * *